(12) United States Patent
Tsai et al.

(10) Patent No.: US 8,817,462 B2
(45) Date of Patent: Aug. 26, 2014

(54) ELECTRONIC DEVICE WITH INTERCHANGEABLE ELECTRONIC MODULE

(75) Inventors: Wen-Cheng Tsai, Taipei (TW);
Ho-Ching Huang, Taipei (TW);
Mei-Hsueh Huang, Taipei (TW);
Chi-Wei Yu, Taipei (TW)

(73) Assignee: Pegatron Corporation, Taipei (TW)

( * ) Notice: Subject to any disclaimer, the term of this patent is extended or adjusted under 35 U.S.C. 154(b) by 281 days.

(21) Appl. No.: 13/556,365

(22) Filed: Jul. 24, 2012

(65) Prior Publication Data
US 2013/0027863 A1    Jan. 31, 2013

(30) Foreign Application Priority Data

Jul. 25, 2011 (TW) .............................. 100126194 A

(51) Int. Cl.
*G06F 1/16* (2006.01)
*H01R 31/00* (2006.01)
*H01R 13/52* (2006.01)

(52) U.S. Cl.
CPC .......... *H01R 13/5213* (2013.01); *H01R 31/005* (2013.01); *G06F 1/1632* (2013.01)
USPC .................. 361/679.4; 439/541.5; 455/569.1; 312/209

(58) Field of Classification Search
USPC ................ 235/486, 492; 361/679.31, 679.47, 361/679.4, 752, 679.03, 679.26, 679.29, 361/679.3, 679.02, 679.28, 679.45, 679.27, 361/679.58, 679.43, 679.33; 439/79, 487, 439/626, 108, 607.2, 629, 607.1, 639, 638, 439/607.55, 541.5, 532; 455/418, 404.1, 455/414.1, 3.06, 575.1, 300, 11.1, 421, 455/556.1, 569.1; 345/440, 1.3, 1.1, 685, 345/905, 158, 173; 312/223.1, 223.6, 194, 312/322, 223.2, 209
See application file for complete search history.

(56) References Cited

U.S. PATENT DOCUMENTS 5,984,731 A    11/1999   Laity
7,382,612 B2   6/2008    Chan et al.
(Continued)

FOREIGN PATENT DOCUMENTS

CN     1920739      2/2007
CN     200962209    10/2007
(Continued)

OTHER PUBLICATIONS

English translation of abstract of TW 473658 (Published Jan. 21, 2002).
(Continued)

*Primary Examiner* — Hung Duong
(74) *Attorney, Agent, or Firm* — McClure, Qualey & Rodack, LLP

(57) ABSTRACT

An electronic device includes a body, an electronic module, and an elastic element, wherein the body has at least an accommodating space and a first connector. The electronic module is accommodated in the accommodating space and has a plurality of connection ports and a second connector electrically connected to the plurality of connection ports. The second connector is electrically connected to the first connector, and the plurality of connection ports is exposed on the outer surface of the body. The elastic element surrounds the junction between the first connector and the second connector, wherein the electronic module presses the elastic element against the body.

10 Claims, 9 Drawing Sheets

(56) References Cited

U.S. PATENT DOCUMENTS

| | | | |
|---|---|---|---|
| 8,282,012 B2 * | 10/2012 | Chen et al. | 235/492 |
| 2005/0181645 A1 * | 8/2005 | Ni et al. | 439/79 |
| 2007/0047192 A1 | 3/2007 | Kobayashi et al. | |
| 2007/0235544 A1 * | 10/2007 | Chen et al. | 235/486 |
| 2011/0063780 A1 | 3/2011 | Yang | |
| 2012/0206874 A1 * | 8/2012 | Huang | 361/679.31 |

FOREIGN PATENT DOCUMENTS

| | | |
|---|---|---|
| JP | 06-155352 | 6/1994 |
| JP | 08-250198 | 9/1996 |
| JP | 11-175211 | 7/1999 |
| JP | 2006-75303 | 3/2006 |
| TW | 435739 | 5/2001 |
| TW | 473658 | 1/2002 |
| TW | 200930232 | 7/2009 |
| TW | M377830 | 4/2010 |

OTHER PUBLICATIONS

Taiwan Office Action dated Feb. 19, 2014.
English translation of abstract of TW M377830 (Published Apr. 1, 2010).
English translation of abstract of TW 200930232 (Published Jul. 1, 2009).
English translation of abstract of CN 1920739 (Published Feb. 28, 2007).
English translation of abstract of JP 2006-75303 (Published Mar. 23, 2006).
Japan Office Action dated Aug. 20, 2013.
English Abstract for CN200962209 (Published Oct. 17, 2007).
English Abstract for TW435739 (Published May 16, 2001).
English translation of abstract of JP 08-250198 (Published Sep. 27, 1996).
English translation of abstract of JP 06-155352 (Published Jun. 3, 1994).
Japan Office Action dated Apr. 15, 2014.

* cited by examiner

ELECTRONIC DEVICE WITH INTERCHANGEABLE ELECTRONIC MODULE

BACKGROUND

1. Technical Field

The disclosure generally relates to an electronic device; particularly to an electronic device that has at least one interchangeable electronic module.

2. Description of the Prior Art

As technologies advance, electronic manufacturers research and develop different types of electronic products according to market needs and wants. However, the different specifications and configurations of each product design commonly result in issues of high incompatibility between different products. In terms of the presently most commonly seen electronic devices, such as laptop computers, handheld electronic devices, and smart phones that are light-weight and convenient, most electronic devices only have 3 to 4 connection interfaces for users to use to connect to other electronic apparatuses.

In addition, when users have a need to connect the electronic device to another electronic device belonging to a specialized field, very often the electronic device of the specialized field will utilize a connection interface very different from any other field. In this case, normal electronic devices would not be able to connect to specialized electronic devices since the specialized electronic device utilizes a specialized interface that is incompatible with normal electronic devices.

SUMMARY

One object of the disclosure is to provide an electronic device that can selectively interchange electronic modules having a plurality of different connection ports.

Another object of the disclosure is to provide a waterproof electronic device.

Yet another object of the disclosure is to provide a vibration-proof electronic device.

An embodiment of the electronic device includes a body, at least one electronic module, and at least one elastic element, wherein the body has at least one accommodating space and a first connector. The electronic module is accommodated in the accommodating space, wherein the electronic module has a plurality of connection ports and a second connector electrically connected to the plurality of connection ports. The plurality of connection ports is exposed on the outer surface of the body. The elastic element surrounds the junction between the first connector and the second connector, wherein the electronic module presses the elastic element against the body. The electronic device may further include a fixing element to fix the electronic module to the body.

In the embodiment, the body further includes a positioning rail disposed in the accommodating space. The electronic module has a positioning groove, wherein the positioning rail and the positioning groove cooperate to guide the electronic module into the accommodating space. The electronic module has at least one ejector mechanism for ejecting the electronic module out of the body.

DETAILED DESCRIPTION

The disclosure provides an electronic device with interchangeable electronic modules. In a preferred embodiment, the electronic device of the present invention may be a handheld electronic device such as a laptop computer or any other multi-functional electronic devices.

Figure 1A:
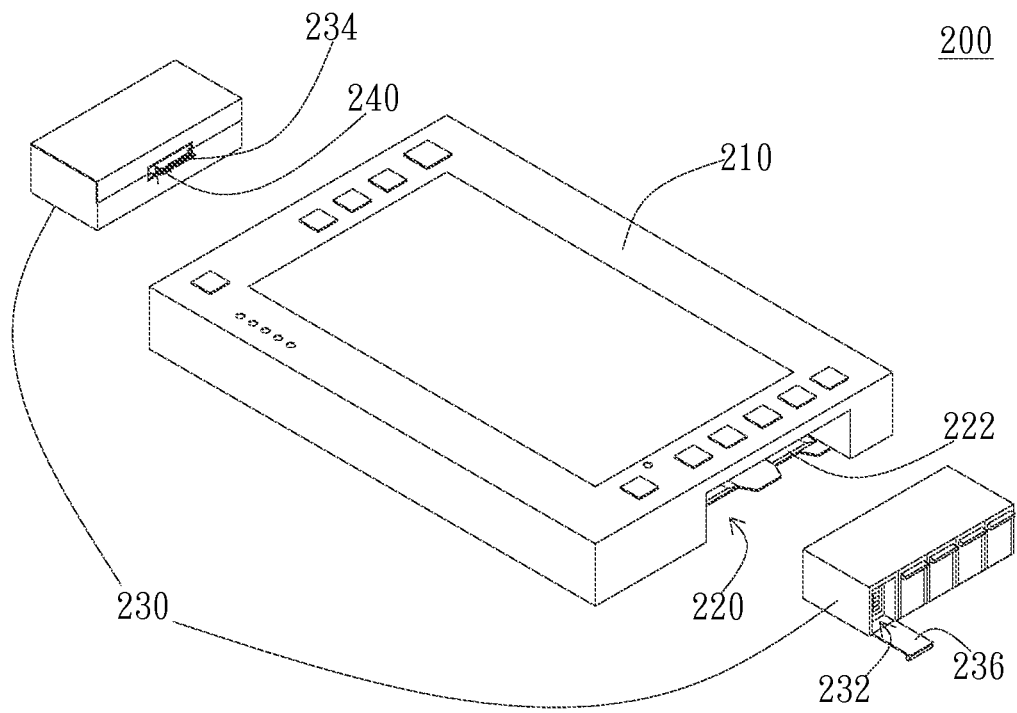
FIGS. 1A and 1B are schematic views of an embodiment of the present invention.

As shown in FIG. 1A, an embodiment of the electronic device 200 includes a body 210, at least one electronic module 230, and an elastic element 240. In a preferred embodiment, the electronic device 200 is a type of handheld computer device, wherein the handheld computer device has a monitor and a plurality of input units (for example, input buttons or keys). The body 210 of the electronic device 200 has an accommodating space 220 that accommodates an electronic module 230. For instance, the body 210 may be a main body portion having functions of the electronic device 200, while the accommodating space 220 may be formed as a gouge space formed on the housing. The accommodating space 220 accommodates the electronic module 230. In another instance, the shape of the accommodating space 220 is preferably identical to the shape of the electronic module 230 such that the accommodating space 220 may lock the electronic module 230 within the accommodating space 220 by having a corresponding shape to the electronic module 230. However, the present invention is not limited to locking the electronic module 230 within the accommodating space 220 through this design. In another embodiment, the electronic module 230 and the body 210 are combined together though other fixing mechanisms (explained in further detail later). In addition, the body 210 has a first connector (not shown) to electrically connect to the electronic module 230.

As shown in FIG. 1A, the electronic module 230 has a plurality of connection ports 232 and a second connector 234 electrically connected to those connection ports 232, wherein the second connector 234 is used to electrically connect with the first connector of the body 210. In an embodiment, the plurality of connection ports 232 and the second connector 234 are preferably disposed on opposite sides of the electronic module 230. However, the present invention is not limited to this design. For instance, the second connector 234 is disposed on one side of the electronic module 230 that faces the body 210 when entering the accommodating space 220. In other words, the side of the electronic module 230 that faces the accommodating space 220, herein called "inner side". The plurality of connection ports 232 are disposed on a side opposite to the second connector 234. In other words, an external side of the electronic module 230 that faces away from the body 210, herein called "outer side". However, in other different embodiments, the second connector 234 may correspond to the first connector in the accommodating space 220, and be disposed on any one side of the electronic module 230 to accomplish the goal of electrically connecting the first connector. Alternatively, the plurality of connection ports 232 may also be disposed on any other sides of the electronic module 230, as long as the electronic module 230 can enable the connection ports 232 to be exposed on the outer surface of the body 210 such that users may utilize the connection ports 232 to connect to other electronic devices when the electronic module 230 is accommodated in the accommodating space 220.

In a preferred embodiment, the electronic module 230 has a plurality of port covers 236 disposed on the outside of each connection port 232, wherein the port covers 236 are movable and used to selectively shield and protect their corresponding connection ports 232, or to allow external connection access to them. For example, in the present embodiment, the port covers 236 are disposed on the lower half of the opening of the connection ports 232. By flipping the port cover 236, the port cover 236 may open and allow access for other electronic devices to connect to the connection port 232, or the port cover 236 may shield the opening of the connection port 232 in order to protect the connection port 232. In other words, when the connection port 232 is not in use, the port cover 236 may prevent liquids or any other contaminants or foreign objects from entering the opening of the connection port 232 and subsequently jamming the connection port 232.

In the present embodiment, the connection port 232 may be any connection interface satisfying any interface protocols, such that the electronic device 200 may be connected to any other suitable electronic devices. For instance, the connection port 232 may be a Universal Serial Bus (USB) interface, an Ethernet port (including RJ-45), a telephone line port, a Serial ATA (SATA) interface, an external SATA (eSATA) interface, a High-Definition Multimedia Interface (HDMI), a Digital Visual Interface (DVI), or any other communication interface. However, the connection port 232 is not limited to the above mentioned connection interfaces; the connection port 232 may be any communication interface in accordance to design requirements. In particular, the electronic device 200 of the present invention can, by way of the electronic module 230 having many similar or different connection ports 232 according to design requirements, provide a variety of connection interfaces. Users may also interchange different electronic modules 230 into the electronic device 200 such that users may change the types of connection ports 232 that may be used to connect to the electronic device 200. In this manner, users may change the input/output interface of the electronic device 200 according to their preference. For instance, when users need the electronic device 200 to connect to another electronic device having a special interface, such as military equipments, users need only change the electronic module 230 in the electronic device 200 to another electronic module 230 having a connection port 232 of that special interface.

Figure 1B:
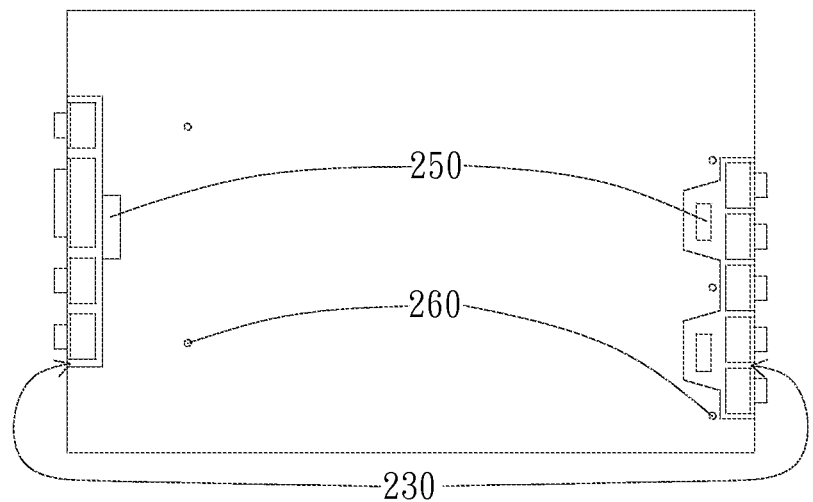

FIG. 1B is a backside view of the electronic device 200. As shown in FIG. 1B, in a preferred embodiment, the electronic module 230 of the electronic device 200 has an ejector mechanism 250 to help eject the electronic module 230 out of the body 210 of the electronic device 200. In the present embodiment, the ejector mechanism 250 is disposed on a bottom portion of the electronic module 230. The ejector mechanism 250 may be a groove or a protrusion such that users may catch an inner side of the groove or press against the protrusion to push the electronic module 230 out of the body 210 of the electronic device 200. However, in other different embodiments, the ejector mechanism 250 may also be of other forms, such as mechanisms using springs to eject the electronic module 232.

Figure 2A:
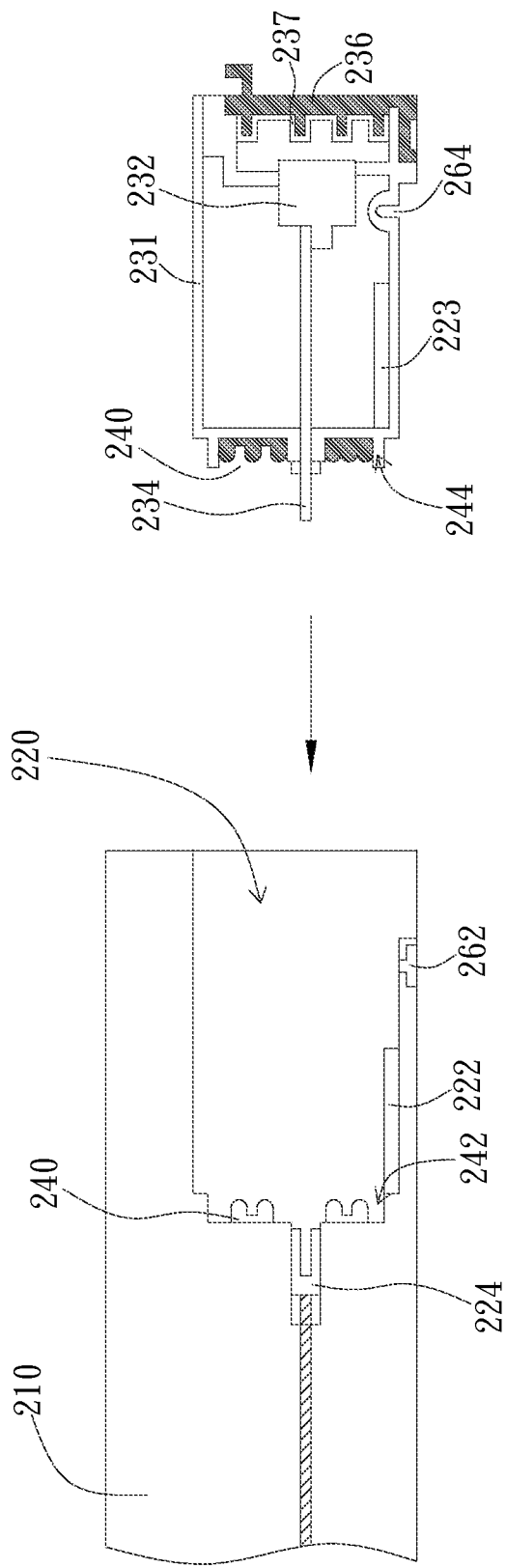
FIGS. 2A and 2B are another embodiment of the present invention.
Figure 2B:
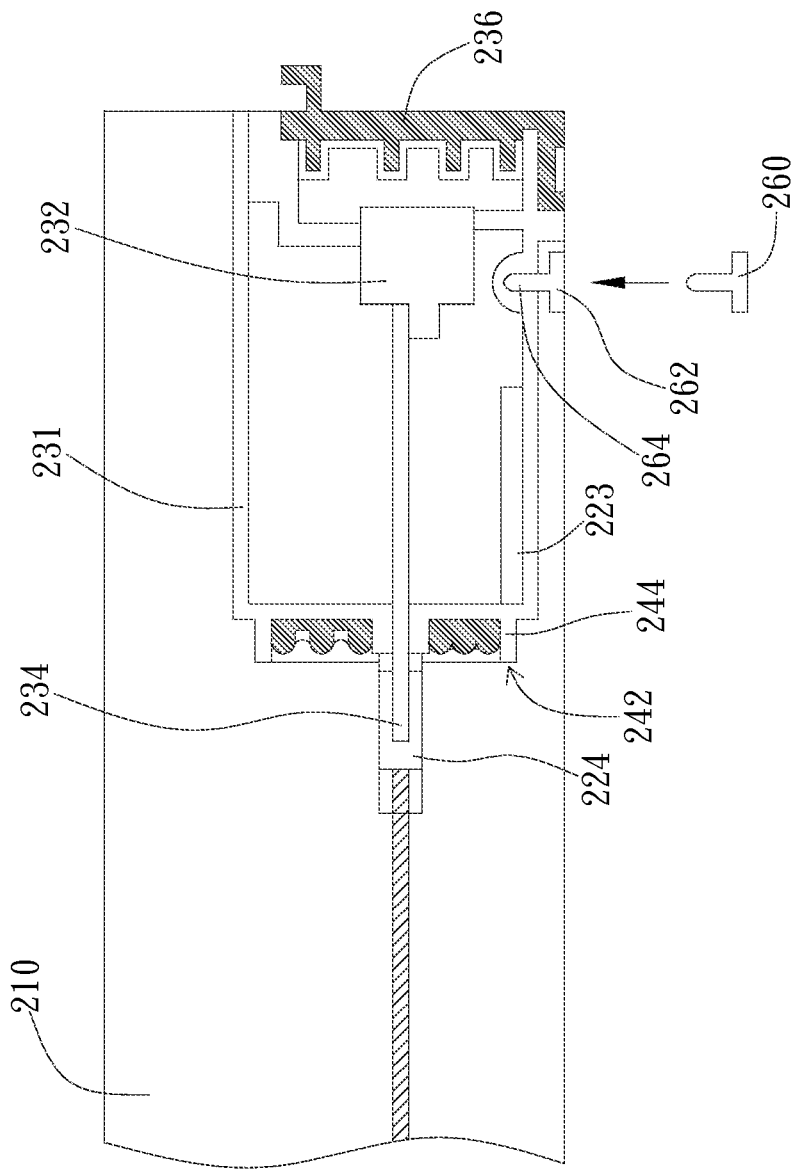

FIGS. 2A and 2B are cross-sectional views of the body 210 and the electronic module 230. As shown in FIG. 2A, the body 210 of electronic device 200 has a first connector 224 disposed on an inner terminal surface in the accommodating space 220. In a preferred embodiment, the body 210 has a guiding rail 222 disposed in the accommodating space 220 (as shown in FIGS. 1 and 2A), while the electronic module 230 has a corresponding positioning groove 223. When the electronic module 230 is accommodated in the accommodating space 220, the guiding rail 222 will cooperate with the positioning groove 223 to guide the electronic module 230 to the correct position within the body 210, such that the second connector 234 of the electronic module 230 may be accurately connected to the first connector 224 of the body 210. In addition, since the guiding rail 222 can also simultaneously prevent the electronic module 230 from moving around freely within the accommodating space 220 of the body 210, the guiding rail 22 can help provide shock protection for the electronic device 200. In the present invention, the first connector 224 and the second connector 234 are connected in form of gold fingers and slots, wherein the first connector 224 receives the gold finger connector head of the second connector 234. However, in other different embodiments, the connector head and slot may be installed the other way around with the second connector 234 receiving the gold finger connector head of the first connector 224.

As shown in FIG. 2A, in the present embodiment, the body 210 and the electronic module 230 separately have an elastic element 240. As shown in FIGS. 1A and 2A, the elastic elements 240 are preferably "O" shaped rings to surround the first connector 224 and the second connector 234. The elastic elements 240 are preferably formed from materials such as plastic, foam, or rubber. In the present embodiment, the elastic element 240 adhered to a terminal wall surface in the accommodating space 220 has two protrusions, while the elastic element 240 (indicated with slanted lines) adhered to the connector head terminal of the electronic module 230 has two grooves. When the second connector 234 of the electronic module 230 contacts the first connector 224 of the body 210, the elastic element 240 adhered to the body 210 will lock together with the elastic element 240 adhered to the electronic module 230 in a meshing fashion (like gear teethes). In this manner, as shown in FIG. 2B, the integration of the electronic module 230 with the body 210 may be enhanced.

In addition, in the present embodiment, the electronic module 230 preferably has a protrusion portion 244 to be tightly accommodated in an accommodating spot 242 on a side of the elastic element 240 adhered inside the accommodating space 220. As shown in FIG. 2B, when the electronic module 230 is accommodated in the accommodating space 220 of the body 210, the protrusion portion 244 and the elastic element 240 (of the body 210 and the electronic module 230) will form a tight contact at the junction between the first connector 224 and the second connector 234 in the accommodating space 220. In this manner, liquids from external sources may not easily enter the junction between the first connector 224 and the second connector 234 to affect the quality of connection between the two connectors.

In addition, as shown in FIGS. 2A and 2B, the electronic module 230 has an outer casing 231 that is preferably formed of plastic, rubber, or silicone. However, in other different embodiments, the outer casing 231 may also be formed from other materials, and then a cushion layer is then distributed on the outer surface of the outer casing 231 to improve the anti-vibration effect of the electronic module 230 in the accommodating space 220 of the body 210. In the present embodiment, when the electronic module 230 is accommodated in the accommodating space 220 of the body 210, the outer casing 231 is preferably tightly contacting the inner wall surface of the accommodating space 220 such that no space between the outer cover 231 and the inner wall of the accommodating space 220 allows liquids from entering.

As shown in FIGS. 2A and 2B, the outer casing 231 of the electronic module 230 has a groove 264, while the body 210 has a hole 262 corresponding to the groove 264. Due to the elastic nature of the elastic element 240, when the electronic module 230 is accommodated in the accommodating space 220 of the body 210, the elastic element 240 will push the electronic module 230 in the direction out of the electronic device 200. In order to enable the electronic module 230 to be in tight contact with the body 210 to enhance that waterproofing effect, when the groove 264 and the hole 262 are aligned to form one singular hole, a fixing element 260 may fix or lock the electronic module 230 in position within the body 210. In addition to the fixing element 260 being able to prevent the elastic element 240 from pushing the electronic module 230 out of the body 210, the fixing element 260 can also simultaneously ensure that the elastic element 240 is wedged between the body 210 and the electronic module 230 in a compressed state. In this manner, the elastic element 240 can be in tight contact with both the electronic module 230 and the body 210 to prevent space or gaps from forming that would allow liquid from external sources to infiltrate the junction or connection point between the first connector 224 and the second connector 234. In the present embodiment, the fixing element 240 is preferably a screw, wherein the preferable distribution spots of the fixing elements 240 are shown in FIG. 1B. However, the fixing element 240 is not limited to this, as the fixing element 240 of the electronic device 200 may also employ other methods of fixing the electronic module 230 to the body 210 without the use of screws. In other different embodiments, the combination of the fixing element 260, the hole 262, and the groove 264 may form a latch structure such that when the electronic module 230 is accommodated in the accommodating space 220, the electronic module 230 may be fixed in the accommodating space 220 through the latch. In this manner, the first connector 224 and the second connector 234 can be connected together while the latch fixes the electronic module 230 within the body 210, ensuring that the elastic element 240 is wedged between the electronic module 230 and the body 210 in a compressed state.

Figure 3A:
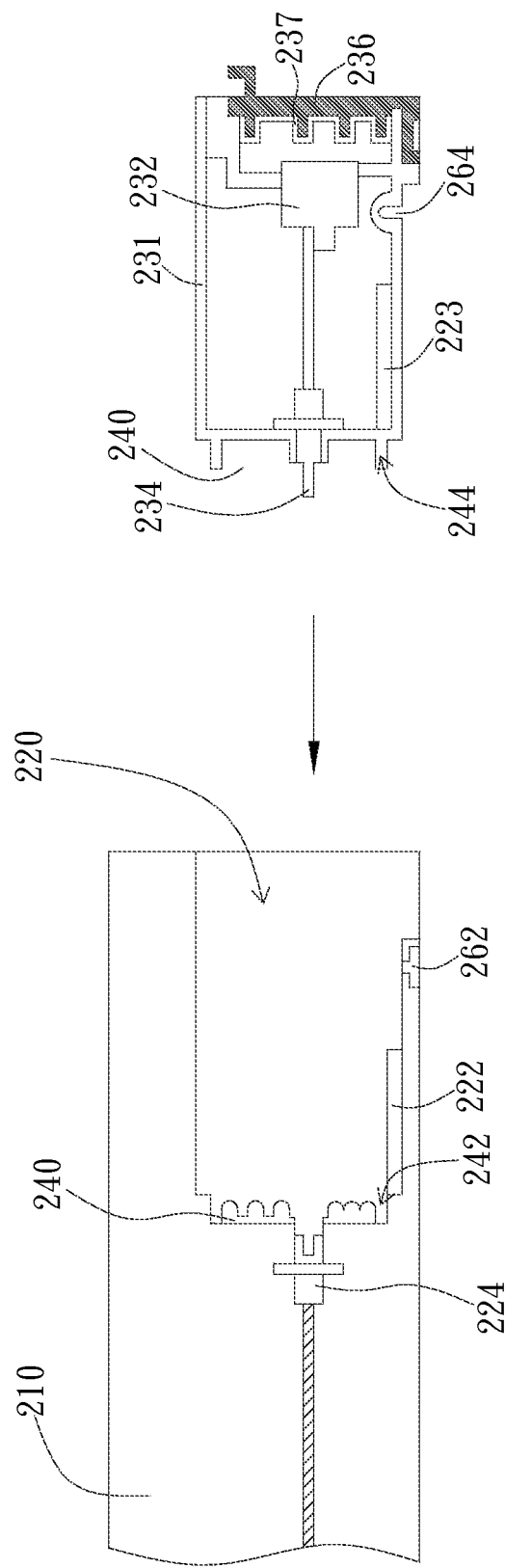
FIGS. 3A and 3B are another embodiment of the present invention.
Figure 3B:
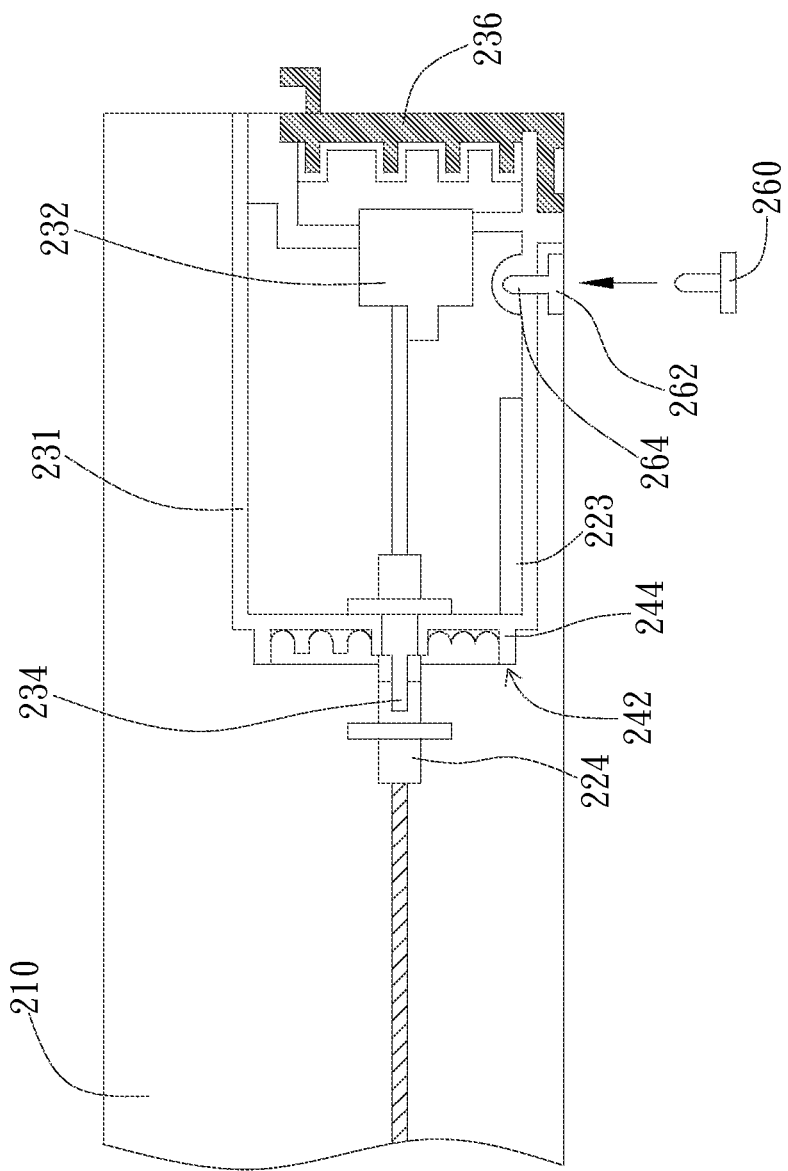

FIGS. 3A and 3B illustrate another embodiment of the electronic device 200. As shown in FIG. 3A, the first connector 224 and the second connector 234 are connected in the form of a plug and socket. In the present embodiment, the plug and socket connection may include gold fingers and slots, Serial ATA (SATA) interface connectors and pins, Optical Disc Drive (ODD) connector and pins, electrical panels and electrical panel contacts, pogo pins and electrical contact surfaces, male and female pin connectors, and other related electrical contact methods. In the present embodiment, other than the fact that the first connector 224 and the second connector 234 are embodied differently, the electronic device 200 is also missing one of the two elastic elements 240 present in the previous embodiment shown in FIGS. 2A and 2B. In other words, in the present embodiment, there is only one ring-shaped elastic element 240 between the body 210 and the electronic module 230. The elastic element 240 is preferably adhered to a wall surface corresponding to where the first connector 224 is positioned in the accommodating space 220. However, in other different embodiments, the elastic element 240 may be adhered in the vicinity of the second connector 234 on the electronic module 230. In the present embodiment, the elastic element 240 preferably has two protrusions. However, in other different embodiments, the elastic element 240 may, according to design requirements, have a plurality of protrusions. As shown in FIG. 3B and mentioned previously, the elastic element 240 is preferably a ring-shaped structure surrounding the first connector 224 and adhered to the body 210. As such, the two protrusions on the elastic element 240 are also ring-shaped, surrounding the first connector 224 with the protrusions extending from the elastic element 240 in the direction away from the wall surface that the elastic element 240 is adhered to in the accommodating space 220. As shown in FIG. 3B, when the electronic module 230 is accommodated in the accommodating space 220, the elastic element 240 will be compressed and wedged between the body 210 and the electronic module 230. In conjunction with the protrusion portions 244, the elastic element 240 will be in tight contact with the electronic module 230 and prevent liquids from external sources from infiltrating the junction between the first connector 224 and the second connector 234.

Figure 4A:
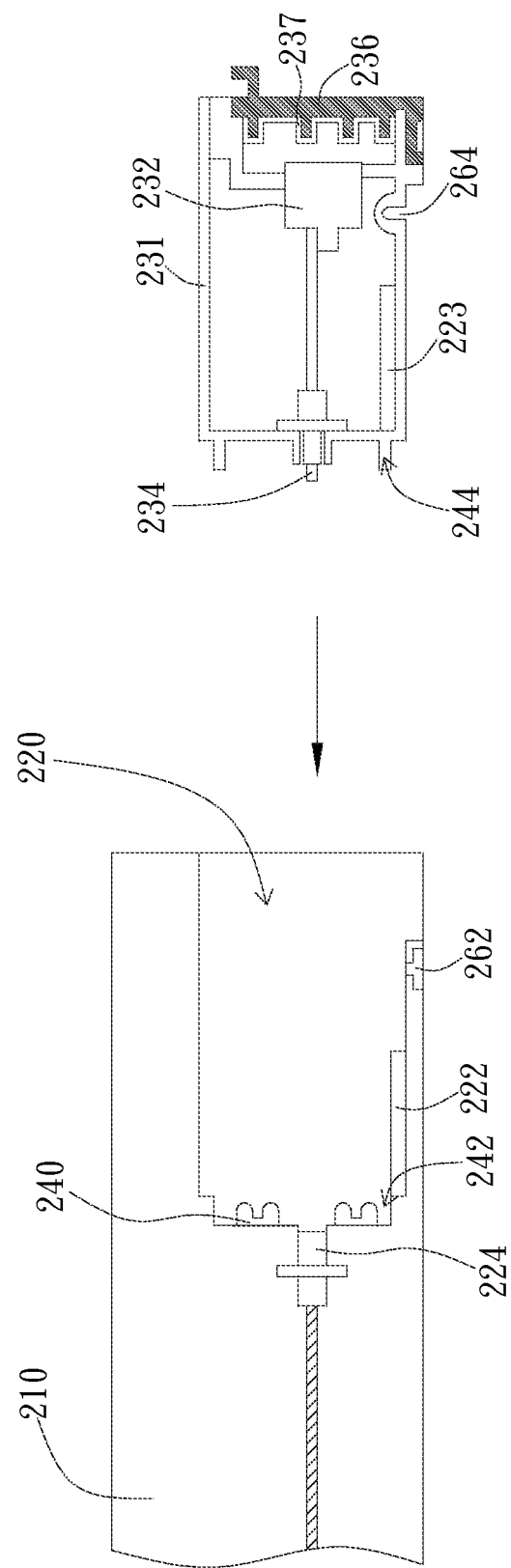
FIGS. 4A and 4B are another embodiment of the present invention.
Figure 4B:
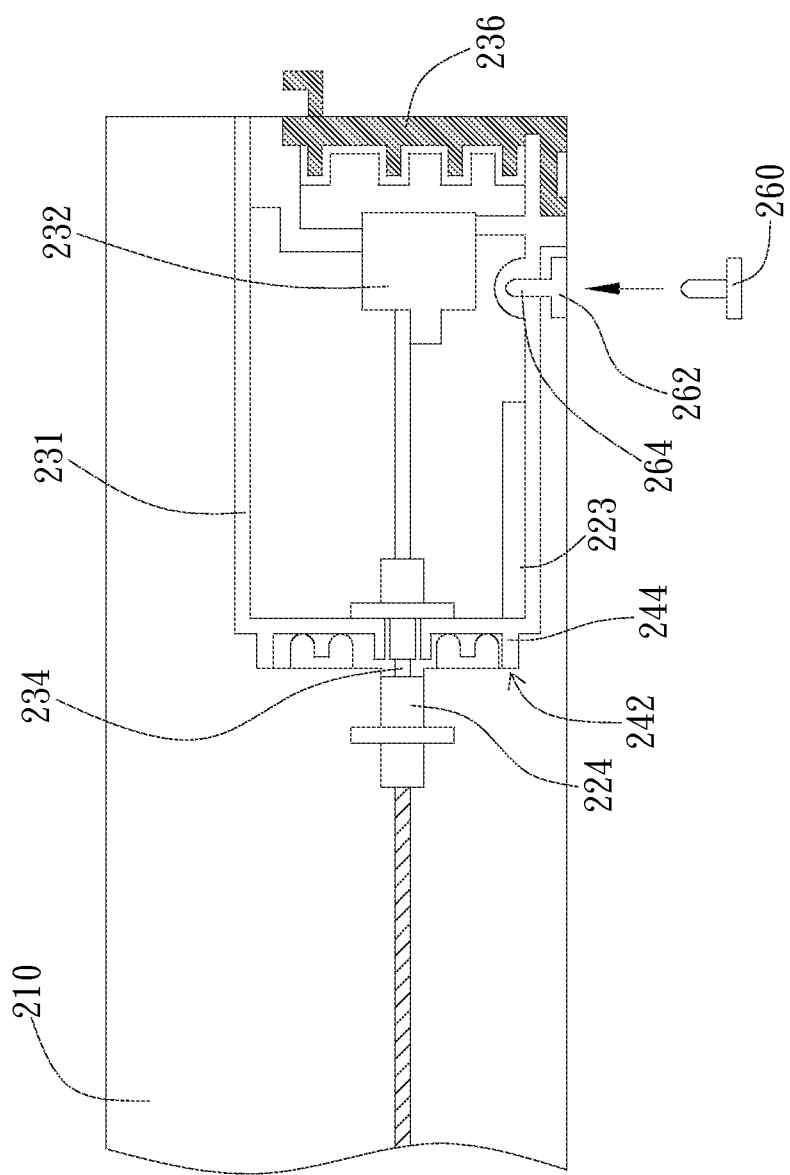

FIGS. 4A and 4B illustrate another embodiment of the electronic device 200. As shown in FIG. 4A, the difference between the present embodiment with the embodiment shown in FIGS. 3A and 3B lies in that the connection method between the first connector 224 of the body 210 and the second connector 234 of the electronic module 230. In the present embodiment, the connector head of the first connector 224 is a pad or an electrical contact surface while the second connector 234 is a pogo pin. When the electronic module 230 moves in the direction towards and into the accommodating space 220, the pogo pin of the second connector 234 will first contact the pad of the first connector 224 and cause an electrical connection to form between the first connector 224 and the second connector 234. As the electronic module 230 gradually moves further into the accommodating space 220, the pad of the first connector 224 will push against the pogo pin of the second connecter 234, causing the pogo pin to recede into itself while still maintaining contact with the pad of the first connector 224. By nature of the pogo pin, although the pogo pin has receded into itself a bit, the pogo pin will still be pushing against the pad of the first connector 224, whereby ensuring that there is a stable electrical connection between the first connector 224 and the second connector 234. In this manner, in conjunction with the elastic element 240, the electronic device 200 can provide waterproofing and vibration/shock-proofing capabilities. The specifics of these capabilities have been described previously, and will not be further discussed here.

Figure 5A:
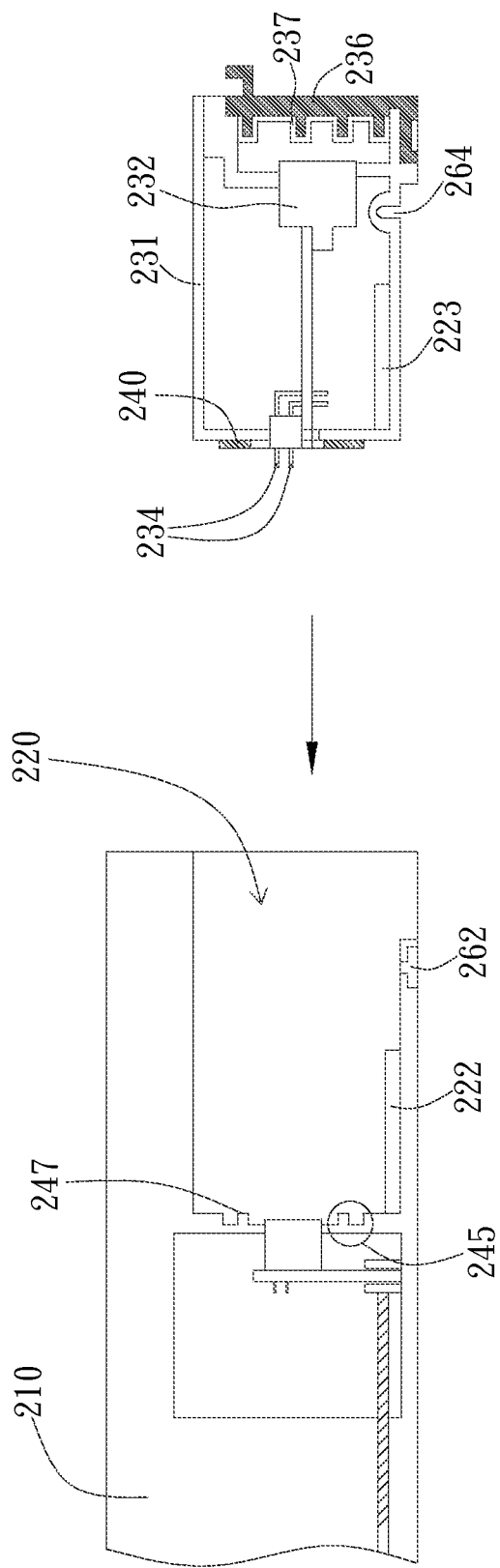
FIGS. 5A and 5B are another embodiment of the present invention.
Figure 5B:
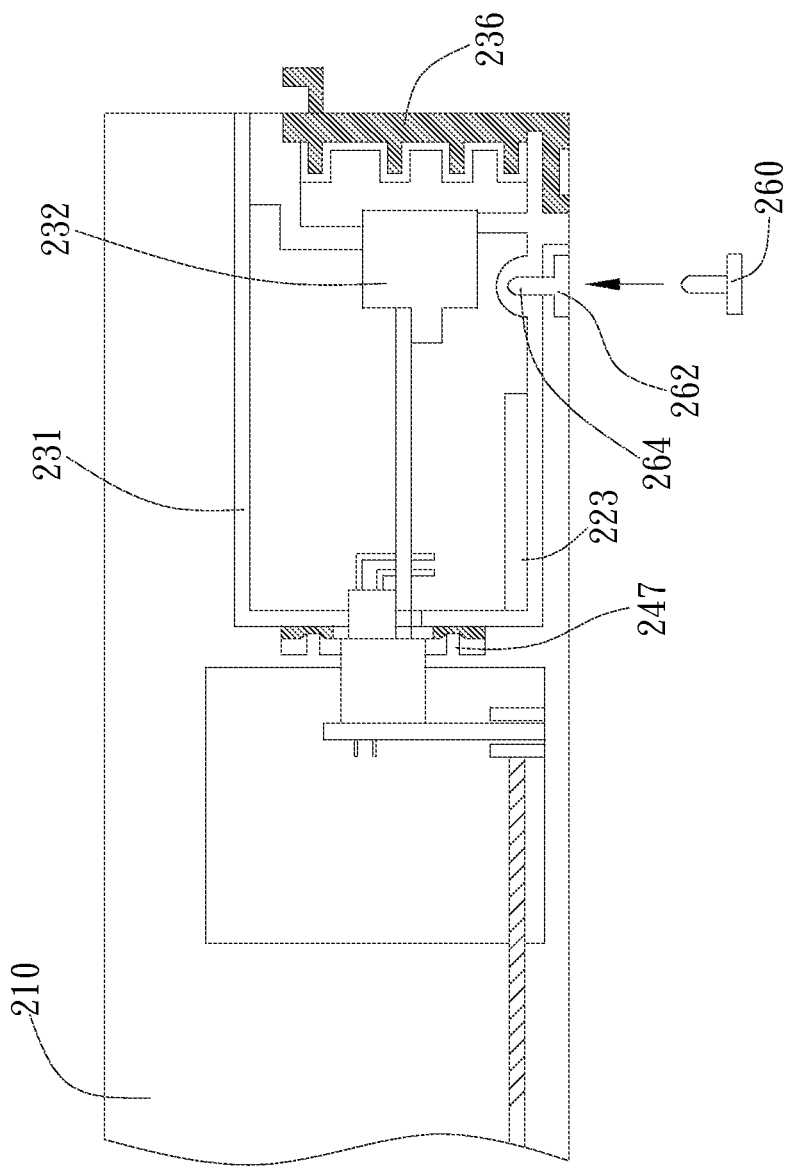

FIGS. 5A and 5B illustrate another embodiment of the electronic device 200, wherein the first connector 224 and the second connector 234 are in the form of pin and socket connection. As shown in FIG. 5A, the second connector 234 of the electronic module 230 is formed as pins. When the electronic module 230 is accommodated in the accommodating space 220, as shown in FIG. 5B, the pins of the second connector 234 are inserted into the sockets or slots of the first connector 224 such that the body 210 may be electrically connected to the electronic module 230. In the present embodiment, in order to prevent liquids from external sources from infiltrating to the junction between the first connector 224 and the second connector 234 and subsequently affect the quality of electrical connection therebetween, another different embodiment of the elastic element 240 is introduced. In the present embodiment, a single elastic element 240 is adhered against the electronic module 230, surrounding the second connector 234 as a ring shape. The elastic element 240 of the present embodiment preferably has no protrusion. In other words, the ring shaped elastic element 240 has a flat surface.

In addition, there is a concave-convex structure 245 surrounding the first connector 224, wherein the concave-convex structure 245 has a protrusion 247. When the electronic module 230 is accommodated in the accommodating space 220 of the body 210, the protrusion 247 of the concave-convex structure 245 will come in contact with the elastic element 240, compressing the elastic element 240 at the point of contact. In this manner, the ring-shaped protrusion 247 will be in tight contact with the elastic element 240 while surrounding the junction between the first connector 224 and the second connector 234 and prevent liquids from external sources from affecting the quality of the junction connection.

The present invention of the electronic device 200 provides users with many benefits. One benefit is that users are able to conveniently, efficiently, and quickly exchange the electronic module 230 with another different electronic module 230 so that different input/output interfaces may be connected to the electronic device 200. In essence, users are able to define which input/output interfaces to use with the electronic device 200. Another benefit is that there is a plurality of connection ports 232 on each electronic module 230, wherein each connection port 232 may be a different input/output interface. In this manner, users may simultaneously use various different interfaces to connect the electronic device 200 to other different electronic apparatuses. A third benefit is that the electronic module 230 connects to the body 210 of the electronic device 200 through the one single second connector 234. In other words, the plurality of connection ports 232 all connect to the body 210 of the electronic device 200 through the single second connector 234 of the electronic module 230. In terms of design, since the various different connection ports 232 may be designed to work with the single second connector 234, users do not need to worry about not having the right input/output interface to use with the electronic device 200 as the present invention provides a true plug and play design format. For instance, by maintaining the same second connector 234, each of the connection ports 232 may be designed to incorporate different type of input/output interfaces such as specialized interfaces (example: military-use input/output interfaces). Users would only need to plug in the electronic module 230 with the specialized connection port 232 to use the specialized connection port 232 on the electronic device 200. A fourth benefit lies in that since the electronic module 230 has a plurality of different input/output interfaces, and that the electronic module 230 may be interchanged with other different electronic modules 230, users may cut down on the number of hardware they would be required to carry with them to use the electronic device 200 with other variously different electronic apparatuses. Users need only carry the required amount of different electronic modules 230 along with the electronic device 200 to connect the electronic device 200 to those various different electronic apparatuses. This allows users to save both space and weight when carrying around the electronic device 200 to use with other electronic apparatuses.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. An electronic device, comprising:
a body having at least one accommodating space and a first connector;
at least one electronic module accommodated in the accommodating space, wherein the electronic module has a plurality of connection ports and a second connector electrically connected to the plurality of connection ports, and the plurality of connection ports is exposed on the outer surface of the body; and
at least one elastic element surrounding the junction between the first connector and the second connector, wherein the electronic module presses the elastic element against the body.

2. The electronic device of claim 1, further comprising at least one fixing element for fixing the electronic module to the body.

3. The electronic device of claim 2, wherein the fixing element includes a screw or a latch.

4. The electronic device of claim 1, wherein the body further includes a positioning rail disposed in the accommodating space, the electronic module has a positioning groove, wherein the positioning rail and the positioning groove cooperate to guide the electronic module into the accommodating space.

5. The electronic device of claim 1, wherein the connection ports include Universal Serial Bus (USB), Ethernet port, High-Definition Multimedia Interface (HDMI), Digital Visual Interface (DVI), Serial ATA (SATA) interface, external SATA interface, or a combination thereof.

6. The electronic device of claim 1, wherein the first connector and the second connector are connected in the form of gold fingers and slots, Serial ATA (SATA) interface connector and pins, Optical Disc Drive (ODD) connector and pins, electrical panels and electrical panel contacts, pogo pin and pad, or male pin connector and female pin connector.

7. The electronic device of claim 1, wherein the elastic element is formed from plastic, foam, or rubber.

8. The electronic device of claim 1, wherein the electronic module has at least one ejector mechanism for ejecting the electronic module out of the body.

9. The electronic device of claim 1, wherein the electronic module has a plurality of port covers that are movable and connected to the electronic module, the port covers are used to selectively shield or allow access to the corresponding connection ports thereof.

10. The electronic device of claim 1, wherein the at least one elastic element comprises a first elastic element disposed in the accommodating space and a second elastic element disposed on the electronic module, the first elastic element and the second elastic element have corresponding concave-convex shapes.

* * * * *